US012572536B2

(12) United States Patent
Raheja et al.

(10) Patent No.: US 12,572,536 B2
(45) Date of Patent: Mar. 10, 2026

(54) CACHE-GENERATED FREQUENTLY ASKED QUESTIONS PAGE

(71) Applicant: Cisco Technology, Inc., San Jose, CA (US)

(72) Inventors: Tarun Raheja, Philadelphia, PA (US); Raunak Sinha, Los Angeles, CA (US); Will Healy, Riverside, CT (US); Jayanth Srinivasa, San Jose, CA (US); Advit Deepak, San Jose, CA (US); Ramana Rao V. R. Kompella, Foster City, CA (US); Ali Payani, Santa Clara, CA (US)

(73) Assignee: Cisco Technology, Inc., San Jose, CA (US)

( * ) Notice: Subject to any disclaimer, the term of this patent is extended or adjusted under 35 U.S.C. 154(b) by 30 days.

(21) Appl. No.: 18/439,888

(22) Filed: Feb. 13, 2024

(65) Prior Publication Data

US 2025/0258818 A1     Aug. 14, 2025

(51) Int. Cl.
　　 *G06F 16/2453* 　　(2019.01)
　　 *G06F 16/2452* 　　(2019.01)
　　　　　　(Continued)

(52) U.S. Cl.
　　CPC .. *G06F 16/24539* (2019.01); *G06F 16/24522* (2019.01); *G06F 16/332* (2019.01); *G06F 16/9032* (2019.01)

(58) Field of Classification Search
　　CPC .......... G06F 16/24539; G06F 16/3334; G06F 16/242; G06F 16/243; G06F 16/248; G06F 16/3347; G06F 16/3349; G06F 16/24522; G06F 16/33; G06F 16/332; G06F 16/3328; G06F 16/3329; G06F 16/335;
　　　　　　(Continued)

(56) References Cited

U.S. PATENT DOCUMENTS 11,106,664 B2 *　8/2021　McElvain ............. G06F 16/248
2004/0243568 A1　12/2004　Wang et al.
　　　　　　(Continued)

OTHER PUBLICATIONS

Cohen-Yashar M., "Building Effective FAQ with Knowledge Bases, BERT and Sentence Clustering", Towards Data Science, Medium, Jun. 15, 2020, 7 Pages.

*Primary Examiner* — Shahid A Alam
(74) *Attorney, Agent, or Firm* — Lee & Hayes, P.C.

(57) ABSTRACT

In one embodiment, a method for a cache-generated frequently asked questions page includes converting a received query into a set of embeddings and performing a semantic searching operation based on information contained in the set of embeddings against a cache of question and answer pairs. The method further includes returning a stored answer to the received query responsive to a determination that a particular question and answer pair in the cache of question and answer pairs meets a threshold similarity level for the information contained in the set of embeddings, the stored answer derived from the particular question and answer pair and performing a large language model operation to generate an answer to the query responsive to a determination that no question and answer pair in the cache of question and answer pairs meets the threshold similarity level for the information contained in the set of embeddings.

20 Claims, 10 Drawing Sheets

(51) Int. Cl.
  *G06F 16/332* (2025.01)
  *G06F 16/9032* (2019.01)
(58) Field of Classification Search
  CPC .... G06F 16/338; G06F 16/9032; G06F 16/93;
  G06F 16/9574; G06F 40/131; G06F
  40/137; G06F 40/151; G06F 40/20
  USPC .......................................................... 707/721
  See application file for complete search history.

(56) References Cited

U.S. PATENT DOCUMENTS

| | | | |
|---|---|---|---|
| 2011/0125734 A1* | 5/2011 | Duboue | G09B 7/00 |
| | | | 707/723 |
| 2011/0153312 A1 | 6/2011 | Roberts | |
| 2013/0070033 A1* | 3/2013 | Rangaraju | B41J 2/175 |
| | | | 347/85 |
| 2015/0044660 A1 | 2/2015 | Byron et al. | |
| 2019/0228099 A1 | 7/2019 | Bajaj et al. | |
| 2019/0340172 A1* | 11/2019 | McElvain | G06F 16/248 |
| 2021/0216577 A1* | 7/2021 | Xiao | G06F 16/3329 |
| 2021/0256045 A1* | 8/2021 | Jiao | G06F 16/35 |
| 2021/0406735 A1* | 12/2021 | Nahamoo | G06F 16/24522 |
| 2023/0028381 A1 | 1/2023 | Meyerzon et al. | |
| 2024/0070489 A1* | 2/2024 | Dang | G06F 16/3334 |
| 2024/0273294 A1* | 8/2024 | Shakeri | G06F 40/295 |

* cited by examiner

400

USER QUERY 420

DATA EXFILTRATION 421

LLM CACHE 423

TOPIC CLUSTERING 425

HIERARCHICAL FAQ PAGE OF SIMILAR QUESTIONS 427

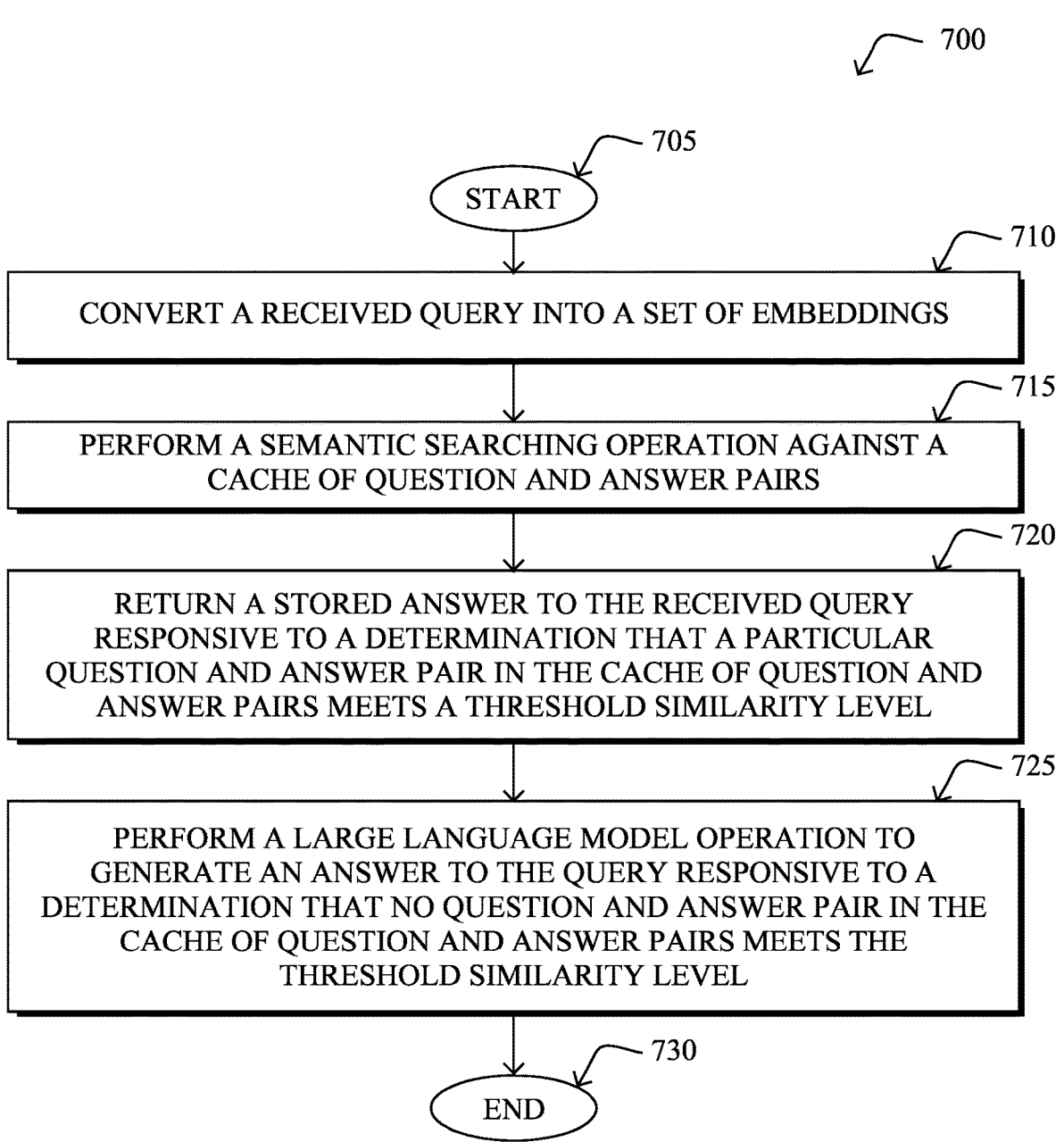

700

705

START

710

CONVERT A RECEIVED QUERY INTO A SET OF EMBEDDINGS

715

PERFORM A SEMANTIC SEARCHING OPERATION AGAINST A CACHE OF QUESTION AND ANSWER PAIRS

720

RETURN A STORED ANSWER TO THE RECEIVED QUERY RESPONSIVE TO A DETERMINATION THAT A PARTICULAR QUESTION AND ANSWER PAIR IN THE CACHE OF QUESTION AND ANSWER PAIRS MEETS A THRESHOLD SIMILARITY LEVEL

725

PERFORM A LARGE LANGUAGE MODEL OPERATION TO GENERATE AN ANSWER TO THE QUERY RESPONSIVE TO A DETERMINATION THAT NO QUESTION AND ANSWER PAIR IN THE CACHE OF QUESTION AND ANSWER PAIRS MEETS THE THRESHOLD SIMILARITY LEVEL

730

END

FIG. 7

CACHE-GENERATED FREQUENTLY ASKED QUESTIONS PAGE

TECHNICAL FIELD

The present disclosure relates generally to computer networks, and, more particularly, to a cache-generated frequently asked questions (FAQs) page.

BACKGROUND

The usage of large language models (LLMs), such as ChatGPT and GPT-4, among others, are becoming more and more common. This trend has trickled down to a wide spectrum of applications and industries where users and consumers of these LLMs seem to see a use for the same. The ability of these models to follow user instructions (or "queries") may provide for user interactions with tools (or "plugins") that are able to perform tasks such as searching the web, executing code, etc. In addition, LLMs are increasingly able to interact with users in a conversational manner to provide answers to highly technical and complex questions.

As the usage of LLMs becomes more widespread, the "natural" and ostensibly direct sounding responses to queries from a user of the LLM will likely continue to be seen by many users as an improvement over traditional internet query techniques. However, the utilization of LLMs is generally quite costly in terms of computing resources, e.g., processing, resources, memory resources, bandwidth, etc. and employing LLMs to answer the same or similar user queries may overburden some systems that rely on LLMs to provide responses to user queries.

BRIEF DESCRIPTION OF THE DRA WINGS

The embodiments herein may be better understood by referring to the following description in conjunction with the accompanying drawings in which like reference numerals indicate identically or functionally similar elements, of which:

FIG. 7 illustrates an example procedure for a cache-generated FAQs page in accordance with the present disclosure.

DESCRIPTION OF EXAMPLE EMBODIMENTS

Overview

According to one or more embodiments of the disclosure, a method for a cache-generated frequently asked questions page includes converting, by a device, a received query into a set of embeddings and performing, by the device, a semantic searching operation based on information contained in the set of embeddings against a cache of question and answer pairs. The method further includes returning, by the device, a stored answer to the received query responsive to a determination that a particular question and answer pair in the cache of question and answer pairs meets a threshold similarity level for the information contained in the set of embeddings, the stored answer derived from the particular question and answer pair and performing, by the device, a large language model operation to generate an answer to the query responsive to a determination that no question and answer pair in the cache of question and answer pairs meets the threshold similarity level for the information contained in the set of embeddings.

Other implementations are described below, and this overview is not meant to limit the scope of the present disclosure.

Description

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, and others. The Internet is an example of a WAN that connects disparate networks throughout the world, providing global communication between nodes on various networks. Other types of networks, such as field area networks (FANs), neighborhood area networks (NANs), personal area networks (PANs), enterprise networks, etc. may also make up the components of any given computer network. In addition, a Mobile Ad-Hoc Network (MANET) is a kind of wireless ad-hoc network, which is generally considered a self-configuring network of mobile routers (and associated hosts) connected by wireless links, the union of which forms an arbitrary topology.

Figure 1:
FIG. 1 illustrates an example computing system.
Figure 1:
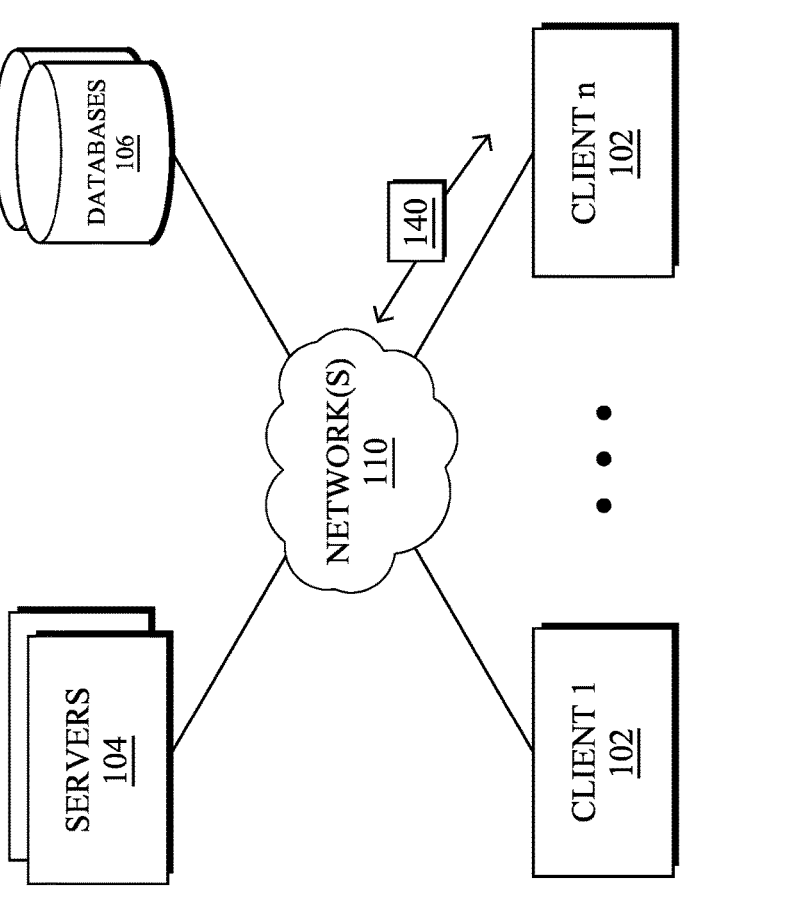

FIG. 1 is a schematic block diagram of an example simplified computing system (e.g., computing system 100) illustratively comprising any number of client devices (e.g., client devices 102, such as a first through nth client device), one or more servers (e.g., servers 104), and one or more databases (e.g., databases 106), where the devices may be in communication with one another via any number of networks (e.g., network(s) 110). The one or more networks (e.g., network(s) 110) may include, as would be appreciated, any number of specialized networking devices such as routers, switches, access points, etc., interconnected via wired and/or wireless connections. For example, the devices shown and/or the intermediary devices in network(s) 110 may communicate wirelessly via links based on WiFi, cellular, infrared, radio, near-field communication, satellite, or the like. Other such connections may use hardwired links, e.g., Ethernet, fiber optic, etc. The nodes/devices typically communicate over the network by exchanging discrete frames or packets of data (packets 140) according to predefined protocols, such as the Transmission Control Protocol/Internet Protocol (TCP/IP) other suitable data structures, protocols, and/or signals. In this context, a protocol consists of a set of rules defining how the nodes interact with each other.

Client devices 102 may include any number of user devices or end point devices configured to interface with the techniques herein. For example, client devices 102 may include, but are not limited to, desktop computers, laptop computers, tablet devices, smart phones, wearable devices (e.g., heads up devices, smart watches, etc.), set-top devices, smart televisions, Internet of Things (IoT) devices, autonomous devices, or any other form of computing device capable of participating with other devices via network(s) 110.

Notably, in some implementations, servers 104 and/or databases 106, including any number of other suitable devices (e.g., firewalls, gateways, and so on) may be part of a cloud-based service. In such cases, the servers and/or databases 106 may represent the cloud-based device(s) that provide certain services described herein, and may be distributed, localized (e.g., on the premise of an enterprise, or "on prem"), or any combination of suitable configurations, as will be understood in the art.

Those skilled in the art will also understand that any number of nodes, devices, links, etc. may be used in computing system 100, and that the view shown herein is for simplicity. Also, those skilled in the art will further understand that while the network is shown in a certain orientation, the computing system 100 is merely an example illustration that is not meant to limit the disclosure.

Notably, web services can be used to provide communications between electronic and/or computing devices over a network, such as the Internet. A web site is an example of a type of web service. A web site is typically a set of related web pages that can be served from a web domain. A web site can be hosted on a web server. A publicly accessible web site can generally be accessed via a network, such as the Internet. The publicly accessible collection of web sites is generally referred to as the World Wide Web (WWW).

Also, cloud computing generally refers to the use of computing resources (e.g., hardware and software) that are delivered as a service over a network (e.g., typically, the Internet). Cloud computing includes using remote services to provide a user's data, software, and computation.

Moreover, distributed applications can generally be delivered using cloud computing techniques. For example, distributed applications can be provided using a cloud computing model, in which users are provided access to application software and databases over a network. The cloud providers generally manage the infrastructure and platforms (e.g., servers/appliances) on which the applications are executed. Various types of distributed applications can be provided as a cloud service or as a Software as a Service (SaaS) over a network, such as the Internet.

Figure 2:
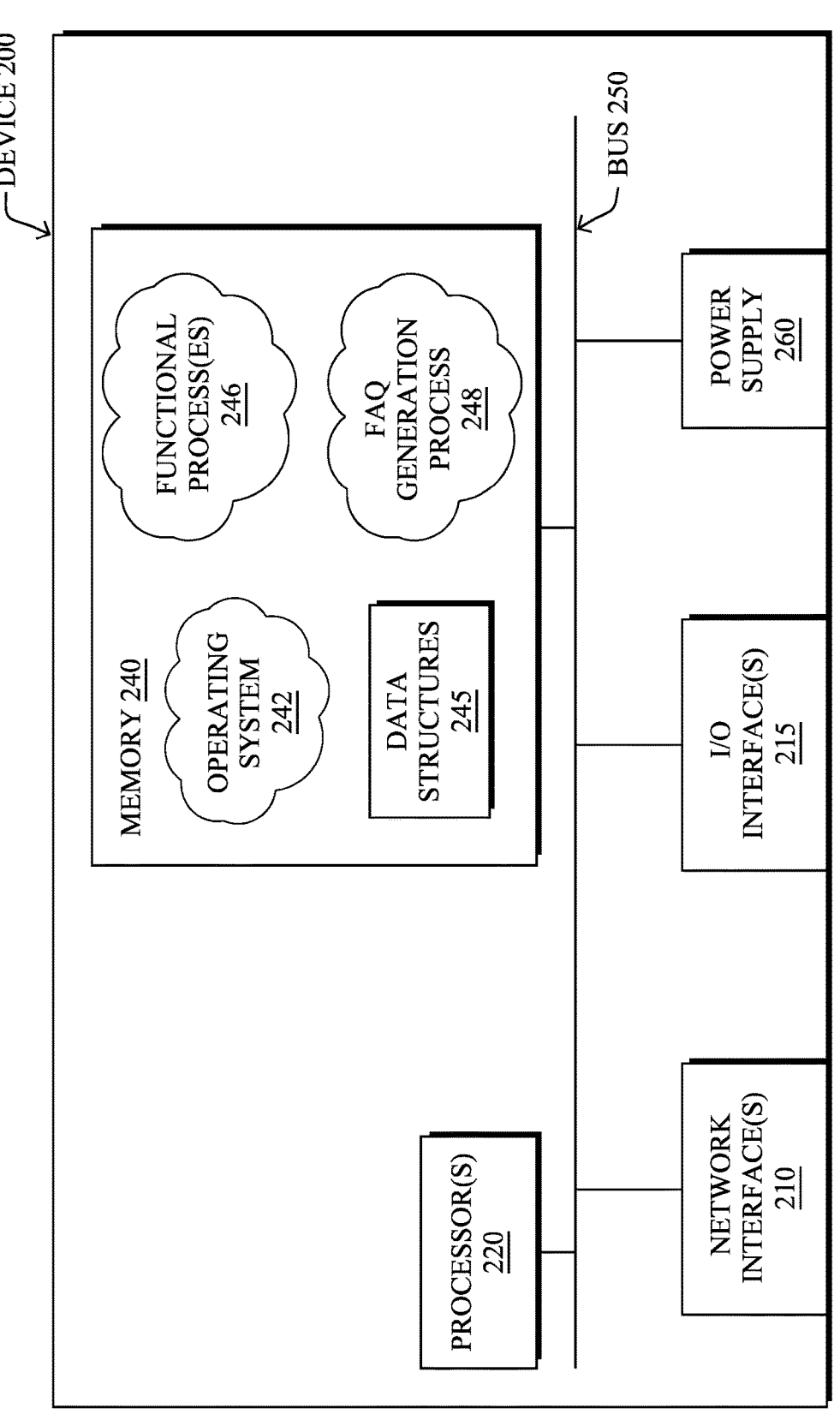
FIG. 2 illustrates an example network device/node.

FIG. 2 is a schematic block diagram of an example node/device 200 (e.g., an apparatus) that may be used with one or more implementations described herein, e.g., as any of the nodes or devices shown in FIG. 1 above or described in further detail below. The device 200 may comprise one or more of the network interfaces 210 (e.g., wired, wireless, etc.), input/output interfaces (I/O interfaces 215, inclusive of any associated peripheral devices such as displays, keyboards, cameras, microphones, speakers, etc.), at least one processor (e.g., processor(s) 220), and a memory 240 interconnected by a system bus 250, as well as a power supply 260 (e.g., battery, plug-in, etc.).

The network interfaces 210 include the mechanical, electrical, and signaling circuitry for communicating data over physical links coupled to the computing system 100. The network interfaces may be configured to transmit and/or receive data using a variety of different communication protocols. Notably, a physical network interface (e.g., network interfaces 210) may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the implementations described herein. The processor(s) 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise one or more functional processes 246, and on certain devices, a frequently asked question (FAQ) generation process (process 248), as described herein, each of which may alternatively be located within individual network interfaces.

Notably, one or more functional processes 246, when executed by processor(s) 220, cause each device 200 to perform the various functions corresponding to the particular device's purpose and general configuration. For example, a router would be configured to operate as a router, a server would be configured to operate as a server, an access point (or gateway) would be configured to operate as an access point (or gateway), a client device would be configured to operate as a client device, and so on.

In various implementations, as detailed further below, the frequently asked question (FAQ) generation process (process 248) may include computer executable instructions that, when executed by processor(s) 220, cause device 200 to perform the techniques described herein.

To do so, in some implementations, process 248 may utilize machine learning. In general, machine learning is concerned with the design and the development of techniques that take as input empirical data (such as network statistics and performance indicators) and recognize complex patterns in these data. One very common pattern among machine learning techniques is the use of an underlying model M, whose parameters are optimized for minimizing the cost function associated to M, given the input data. For instance, in the context of classification, the model M may be a straight line that separates the data into two classes (e.g., labels) such that $M=a*x+b*y+c$ and the cost function would be the number of misclassified points. The learning process then operates by adjusting the parameters a, b, c such that the number of misclassified points is minimal. After this optimization phase (or learning phase), model M can be used very easily to classify new data points. Often, M is a statistical model, and the cost function is inversely proportional to the likelihood of M, given the input data.

In various implementations, process 248 may employ one or more supervised, unsupervised, or semi-supervised machine learning models. Generally, supervised learning entails the use of a training set of data, as noted above, that is used to train the model to apply labels to the input data. For example, the training data may include sample network observations that do, or do not, violate a given network health status rule and are labeled as such. On the other end of the spectrum are unsupervised techniques that do not require a training set of labels. Notably, while a supervised learning model may look for previously seen patterns that have been labeled as such, an unsupervised model may instead look to whether there are sudden changes in the behavior. Semi-supervised learning models take a middle ground approach that uses a greatly reduced set of labeled training data.

Example machine learning techniques that process 248 can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), logistic or other regression, Markov models or chains, principal component analysis (PCA) (e.g., for linear models), singular value decomposition (SVD), multi-layer perceptron (MLP) ANNs (e.g., for non-linear models), replicating reservoir networks (e.g., for non-linear models, typically for time series), random forest classification, or the like.

In further implementations, process 248 may also include one or more generative artificial intelligence/machine learning models. In contrast to discriminative models that simply seek to perform pattern matching for purposes such as anomaly detection, classification, or the like, generative approaches instead seek to generate new content or other data (e.g., audio, video/images, text, etc.), based on an existing body of training data. For instance, in the context of network assurance, process 248 may use a generative model to generate synthetic network traffic based on existing user traffic to test how the network reacts. Example generative approaches can include, but are not limited to, generative adversarial networks (GANs), large language models (LLMs), other transformer models, and the like. In some instances, process 248 may be executed to intelligently route LLM workloads across executing nodes (e.g., communicatively connected GPUs clustered into domains).

The performance of a machine learning model can be evaluated in a number of ways based on the number of true positives, false positives, true negatives, and/or false negatives of the model. For example, the false positives of the model may refer to the number of times the model incorrectly predicted whether a network health status rule was violated. Conversely, the false negatives of the model may refer to the number of times the model predicted that a health status rule was not violated when, in fact, the rule was violated. True negatives and positives may refer to the number of times the model correctly predicted whether a rule was violated or not violated, respectively. Related to these measurements are the concepts of recall and precision. Generally, recall refers to the ratio of true positives to the sum of true positives and false negatives, which quantifies the sensitivity of the model. Similarly, precision refers to the ratio of true positives to the sum of true and false positives.

It will be apparent to those skilled in the art that other processor and memory types, including various computer-readable media, may be used to store and execute program instructions pertaining to the techniques described herein. Also, while the description illustrates various processes, it is expressly contemplated that various processes may be implemented as modules configured to operate in accordance with the techniques herein (e.g., according to the functionality of a similar process). Further, while processes may be shown and/or described separately, those skilled in the art will appreciate that processes may be routines or modules within other processes.

—Cache-Generated Frequently Asked Questions Page—

As noted above, the techniques herein allow for the generation of frequently asked question (FAQ) pages based on cached question-answer pairs for a large language model (LLM)-based system. For example, recent breakthroughs in LLMs, such as ChatGPT and GPT-4, represent new opportunities across a wide spectrum of industries. The ability of these models to follow instructions now allow for interactions with tools (also called plugins) that are able to perform tasks such as searching the web, executing code, etc. In addition, LLMs are also able to interact with human users in a conversational manner to provide answers to highly technical and complex questions.

As a result, as LLMs become more advanced, frequently asked question (FAQ) pages are expected to become largely obsolete, as LLMs can provide more natural sounding answers to queries from users. In addition, LLMs can directly respond to queries from users. However, due to the computational resources (e.g., processing, memory, etc. resources) associated with operating LLMS, using LLMs to answer the same questions repeatedly can become quite costly in terms of such computational resources.

In order to mitigate these costs and in order to improve question and answer mechanisms that rely on current paradigms, the techniques described herein can leverage a caching mechanism for a LLM to generate a FAQ page that users can quickly reference, rather than issuing queries to the LLM. As described in more detail herein, these and other techniques disclosed herein can avoid the costly process of sending the user's query on to the LLM. However, if there is no cache hit, the techniques described herein may then use the LLM to provide an answer to a query based on any number of source documents. This flexibility therefore allows the systems described herein to cache determined query answer pairs uncovered by the LLM for future reference, thereby reducing future calls to the LLM. This may further reduce the necessity of additional calls to the LLM, which may be costly, particularly as the systems described herein learn and evolve over time.

Specifically, according to one or more embodiments of the disclosure as described in detail below, a method for a cache generated frequently asked questions page includes converting, by a device, a received query into a set of embeddings and performing, by the device, a semantic searching operation based on information contained in the set of embeddings against a cache of question and answer pairs. The method further includes returning, by the device, a stored answer to the received query responsive to a determination that a particular question and answer pair in the cache of question and answer pairs meets a threshold similarity level for the information contained in the set of embeddings, the stored answer derived from the particular question and answer pair and performing, by the device, a large language model operation to generate an answer to the query responsive to a determination that no question and answer pair in the cache of question and answer pairs meets the threshold similarity level for the information contained in the set of embeddings.

As described in more detail herein, aspects of the present disclosure include leveraging a caching mechanism that can operate in connection with a large language model (LLM) to generate a frequently asked questions (FAQ) page that users can reference, as opposed to issuing every query (e.g., every user query or "question") to the LLM. An example of a system/architecture that can provide these and other aspects of the present disclosure is shown in FIG. 3.

Figure 3:
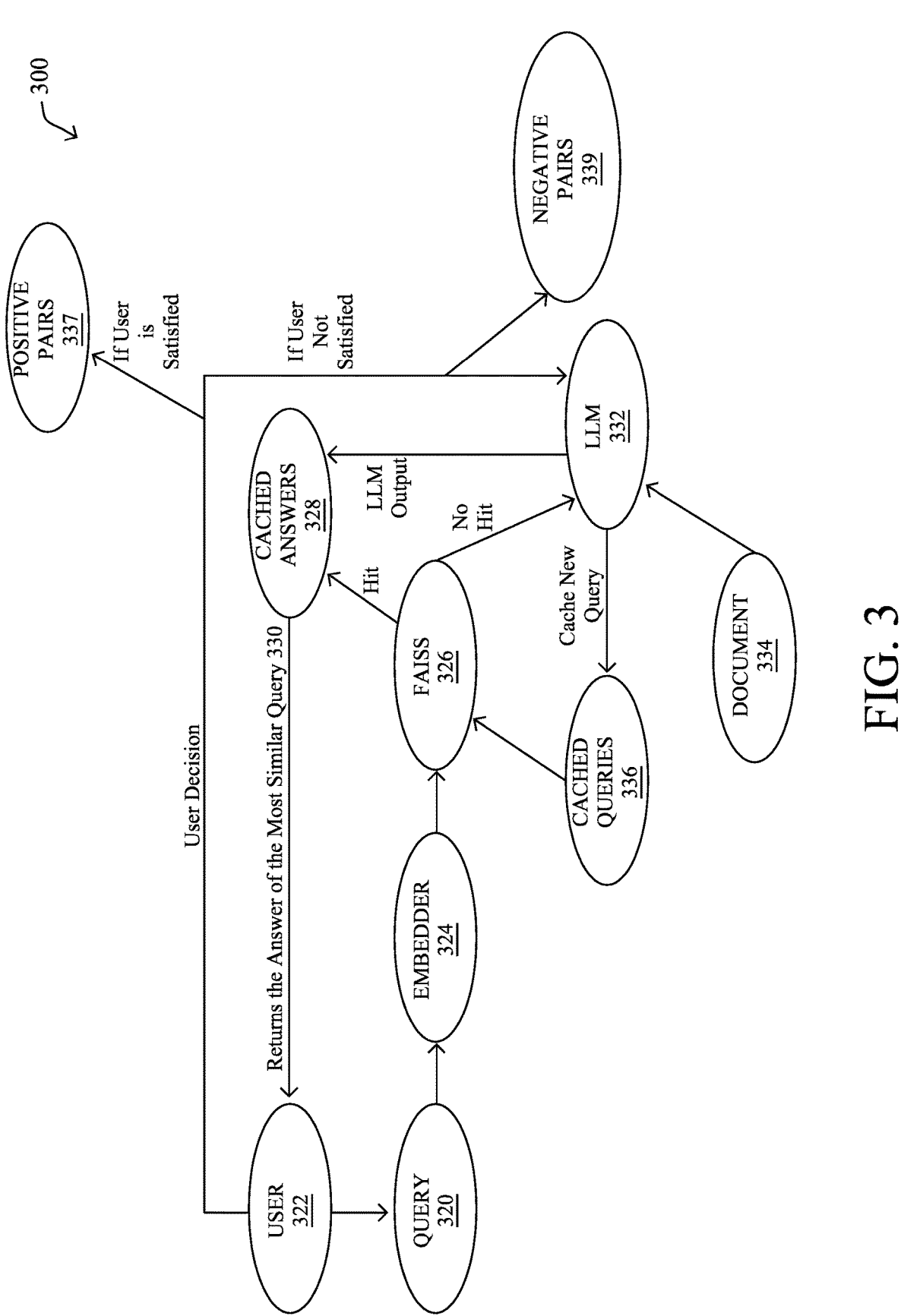
FIG. 3 illustrates an example of a large language model cache system in accordance with the present disclosure.

Operationally, FIG. 3 illustrates an example of a large language model cache system. As shown in FIG. 3, the system 300 receives a query 320 from a user 322. In some implementations, the query 320 is received via a user interface, which can be a graphical user interface (GUI). The system 300 then uses an embedder 324 to convert the query 320 into a set of embeddings. In some implementations, the embedder 324 can be a pre-trained sentence transformer, a Bidirectional Encoder Representations from Transformers (BERT) model that has been fine-tuned for question-answer processing, or a Simple Contrastive Learning of Sentence Embeddings (SimCSE) to create semantically meaningful sentence embeddings, or other suitable embedder.

Once the query 320 has been converted into a set of embeddings, the system 300 may perform semantic searching against a cache of question and answer pairs. For instance, as shown, the system could use Facebook AI Semantic Search (FAISS 326) or another semantic search engine, to attempt to match the embeddings of the query to any of those in the cache. If there is a cache hit (e.g., the query embeddings have a high degree of similarity to a stored embedding for a query in the cached answers 328), as shown by the arrow labeled "hit," the system 300 may simply return the answer for that cached query, as shown at operation 330. This may allow for avoidance of sending the query 320 to a large language model 332, which, as mentioned above, can be costly in terms of resource consumption.

However, if there is no cache hit, as shown by the arrow labeled "no hit," the system 300 may use the large language model 332 to provide an answer to the query 320 based on any number of source documents (e.g., the documents 334). In some implementation, the documents 334 can be documents that are given and/or supplied to the system 300 and can therefore be documents that are contained within the system 300 as opposed to documents that may be accessible to entities that are not associated with the system 300. Further, as shown in FIG. 3, if the large language model 332 provides the answer to the query 320, the system 300 may cache (as shown by the arrow labeled "LLM output") the question and answer pair associated with that query 320 as one of multiple cached queries (e.g., the cached queries 336) for future reference. By caching the question and answer pair associated with the query 320 when the large language model 332 is invoked, future calls to the large language model 332 can be mitigated for similar queries.

In some implementations, the system 300 may further include a mechanism that allows users to provide user feedback regarding the provided answer (or answers) to the query 320. For example, the user (e.g., the person who makes the query and receives the answer to the query) can provide positive feedback, e.g., "if user satisfied" or negative feedback, e.g., "if user not satisfied" to the response to the query, as shown in FIG. 3. This feedback may be considered by the system 300 to seek a new answer from the large language model 332, among other possibilities.

Further, the system 300 can log (e.g., write information corresponding to) the positive feedback as positive pairs 337 or can log the negative feedback as negative pairs 339. That is, in response to positive user feedback, the system 300 can log question and answer pairs that the user(s) find helpful and/or or accurate as positive pairs 337 while the system 300 can log question and answer pairs that the user(s) find unhelpful and/or or not accurate as negative pairs 339. This can further allow the system 300 to be updated to provide better or more useful answers to queries and/or to generate more helpful FAQ pages while minimizing the number of times the large language model 332 is repetitiously invoked, thereby reducing the resource consumption of architectures in which implementations of the present disclosure are operated.

Accordingly, implementations of the present disclosure can provide a large language model caching system that can generate a FAQ page based on the most common question and answer pairs encounter by the caching mechanisms described herein.

Figure 4:
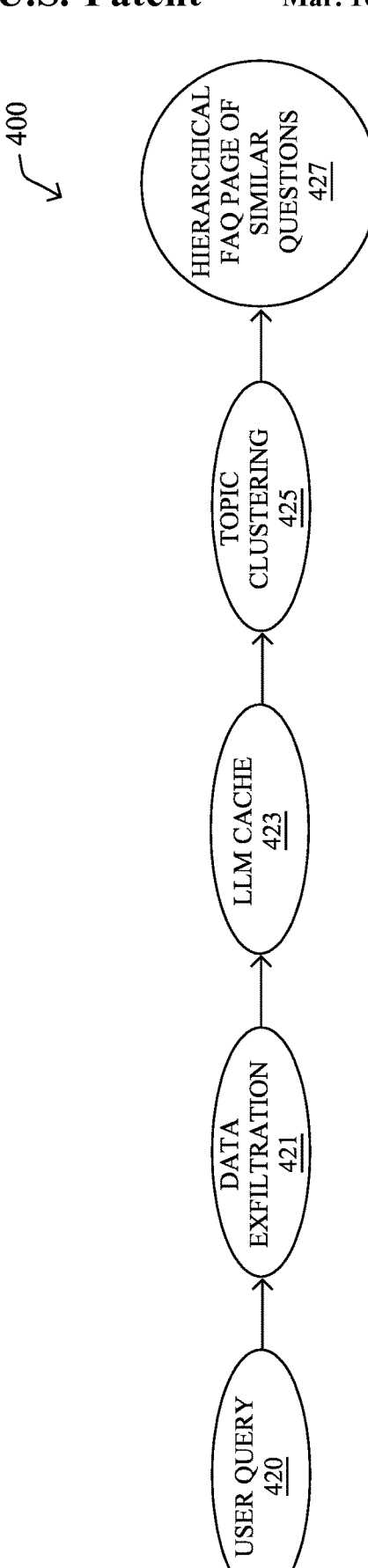
FIG. 4 illustrates an example flow for a large language model cache system to generate a frequently asked question (FAQ) page in accordance with the present disclosure.

FIG. 4 illustrates an example flow for a large language model cache system to generate a frequently asked question page in accordance with the present disclosure. As shown in FIG. 4, the flow 400 begins with receipt of a user query 420, which may be analogous to the query 320 of FIG. 3. The flow 400 continues to provide data exfiltration 421, which may be analogous to the operations performed by the embedder 324, the FAISS 326, the large language model 332, etc. of FIG. 3. As shown in FIG. 4, a large language model cache 423 is provided and is configured to output information to a topic clustering module 425. The topic clustering module 425 may then generate a hierarchical FAQ page 427. As described in more detail below, the hierarchical FAQ page 427 can show sets or subsets of "most similar questions," e.g., queries that meet a threshold similarity level for the information contained in the set of embeddings as provided by, for example, the data exfiltration 421.

As mentioned above, some implementations provide for the generation an FAQ page based on user queries (and in some implementations, generations of an FAQ page based on each user query). In order to generate these FAQ pages, implementations herein take frequently "clicked" (e.g., accessed) questions from a cache of question and answer pairs, such as the cached answers 328 and/or the cached queries 336 of FIG. 3).

Relevant FAQs may be chosen by taking into account the frequency with which question and answer pairs have been clicked on as well as their semantic similarity to the user query 420. For example, in some implementations, when a user "clicks" on a question presented on a FAQ page, the user can then be presented (e.g., via a user interface) the n most relevant questions to a same or a similar question that are stored in the caches described above. It is noted that, the "relevancy" of such queries can be a function of semantic similarity, frequency of query (e.g., the number of times other users have provided a same or similar query), etc.

Advantageously, this may allow for the user to quickly search the cache(s) for commonly asked questions as well as to search for more and more specific questions as these users click through each level of the questions. In addition, this may allow for the user to locate answers to queries without necessarily invoking a large language model for each query.

In furtherance of these and other advantages of the present disclosure, some implementations can allow for the creation of a hierarchical FAQ page that can be generated by clustering cache items into topics via an unsupervised topic modeling approach. Implementations are not so limited, however, and in other implementations, a hierarchical FAQ page can be generated in response to input(s) (e.g., commands, etc.) from a system administrator that can be used to define a main topics of the FAQ page and that can provided as part of a user interface to the system administrator and/or to the user(s), as discussed in more detail below.

Figure 5A:
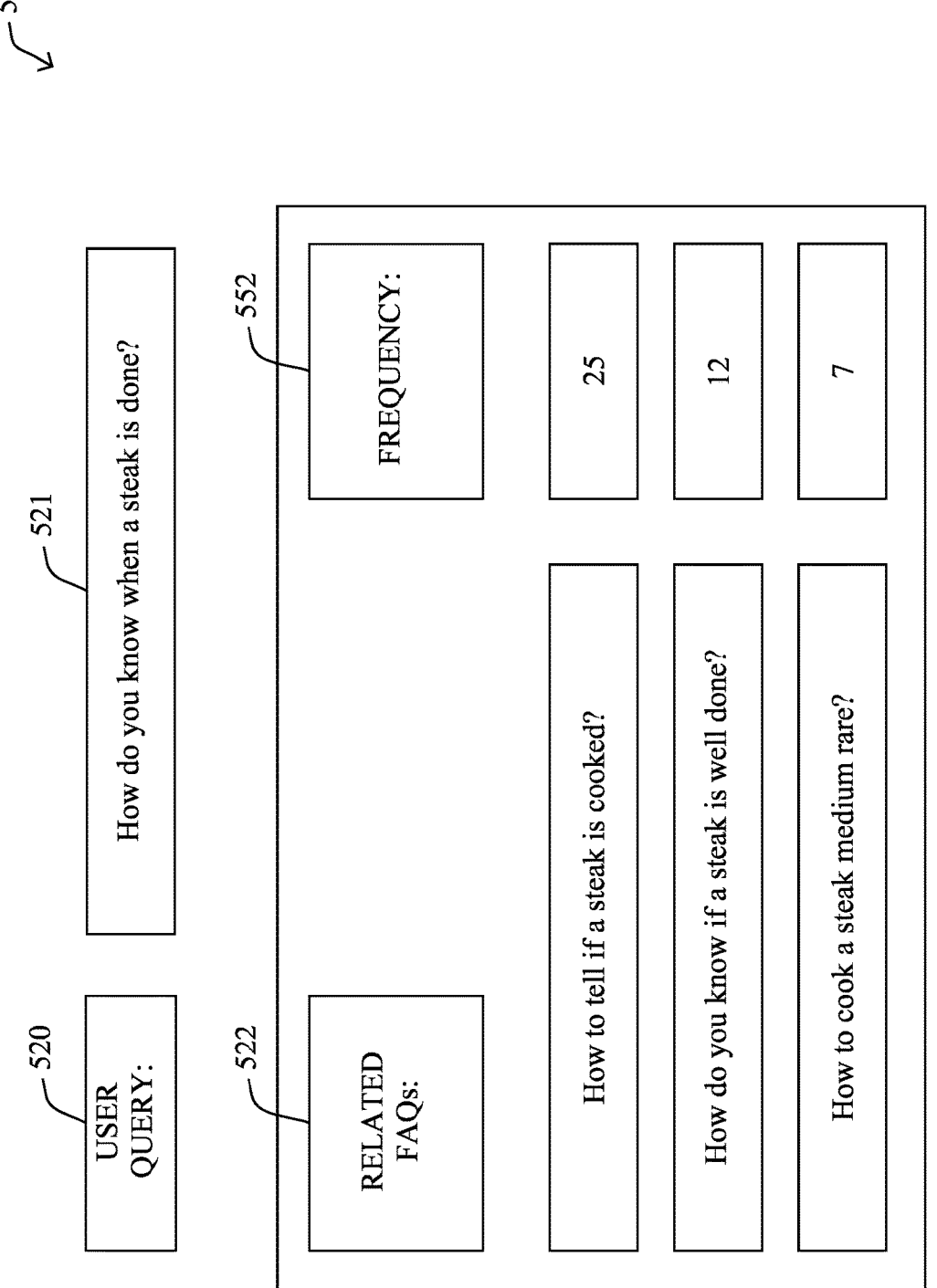
FIG. 5A illustrates an example user interface for a FAQ generation mechanism showing a first user query in accordance with the present disclosure.

FIG. 5A illustrates an example user interface for a frequently asked question generation mechanism showing a first user query in accordance with the present disclosure. The user query 520 can be analogous to the query 320 and/or the user query 420 of FIG. 3 and FIG. 4, respectively.

As illustrated in FIG. 5A, the user interface 500, which can be a graphical user interface, can accept a user query 520, which includes a posed question 521. The posed question 521 is the actual natural language query from the user and in the non-limiting example of FIG. 5A is shown as a natural language question in order to elucidate implementations of the present disclosure. In the non-limiting example of FIG. 5A, the user may not know how to cook a steak, as evidenced by the posed question 521 being "how do you know when a steak is done."

In this example, related FAQs 550 can be associated with a frequency 552 of hits that correspond to a number of times that semantically similar questions have been received by a system (e.g., the system 300 of FIG. 3). The frequency 552 of hits can be correlated to a similarity level for the information contained in the set of embeddings described herein, although implementations are not so limited, and the techniques described in connection with FIG. 3 may also be used to determine the frequency 552.

In response to receipt of this user query 520 related FAQs 522 can be analyzed based on the frequency 552 of hits associated with each of the related FAQs 522. As shown in FIG. 5A, the related FAQs 522 can include semantically similar questions to the posed question 521, such as "how to tell if a steak is done" (that has, in this non-limiting example, a frequency 552 of "25"), "how do you know if a steak is well done" (that has, in this non-limiting example, a frequency 552 of "12"), and "how to cook a steak medium rare" (that has, in this non-limiting example, a frequency 552 of "7").

It is noted that the frequency 552 of the query "how do you know if a steak is well done" being higher than the frequency 552 of the query "how to cook a steak medium rare" in this non-limiting example may be due to the fact that a user who knows how to cook a steak would be less likely to submit a query on how to cook said steak to a "well done" state and would instead rely on their experience and knowledge of cooking steaks to properly cook said steak to a "medium rare" state.

Regardless, once the user has clicked on the first query discussed in connection with FIG. 5A, the user interface may be updated in response to said click on the first query, as discussed in more detail connection with FIG. 5B.

Figure 5B:
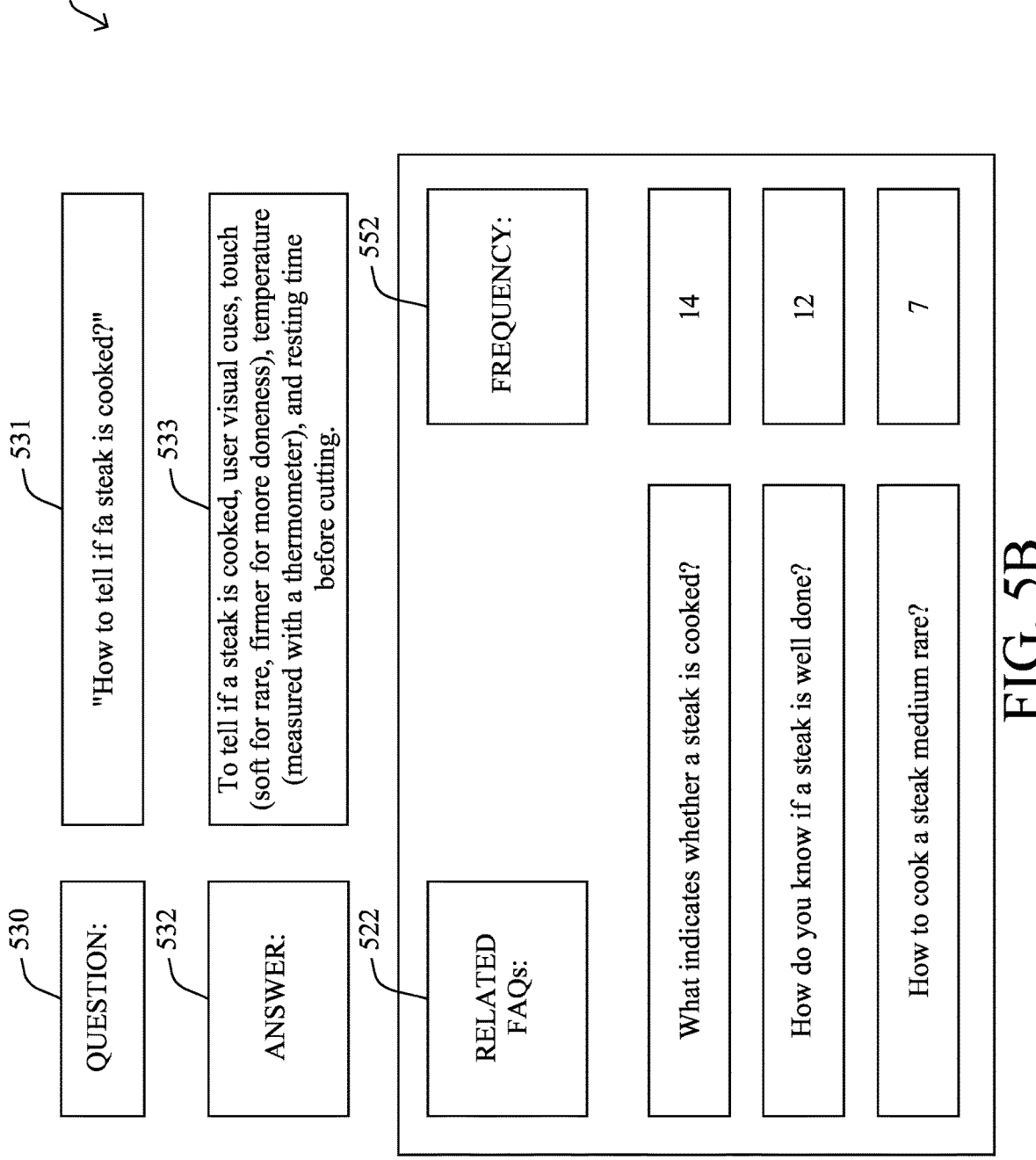
FIG. 5B illustrates an example user interface for a FAQ generation mechanism showing a response to the first user query in accordance with the present disclosure.

FIG. 5B illustrates an example user interface for a frequently asked question generation mechanism showing a response to the first user query in accordance with the present disclosure. The user interface 500 of FIG. 5B can be a graphical user interface and may be analogous to the user interface 500 of FIG. 5A. However, as shown in FIG. 5B, the user interface 500 can be updated in response to user interaction with the first query discussed in connection with FIG. 5A.

For example, in FIG. 5B, the user query 520 of FIG. 5A can be transposed into a question 530, which in the non-limiting example of FIG. 5B becomes a posed question 531 that states "how to tell if a steak is cooked?" As shown in FIG. 5B, an answer 532 to the posed question 531 can be "to tell if a steak is cooked, use visual cues, touch (soft for rare, firmer for more doneness), temperature (measured with a thermometer), and resting time before cutting," as shown at block 533.

Similar to FIG. 5A, related FAQs 522 can be provided, along with a frequency 552 of the occurrences of these related FAQs 522. In the example of FIG. 5B, the related FAQs 522 can include semantically similar queries to the question 530, such as "what indicates whether a steak is cooked" (that has, in this non-limiting example, a frequency 552 of "14"), "how do you know if a steak is well done" (that has, in this non-limiting example, a frequency 552 of "12"), and "how to cook a steak medium rare" (that has, in this non-limiting example, a frequency 552 of "7"). However, in FIG. 5B, the answer 532, which is derived in accordance with the techniques described above, may serve to drive the related FAQs 522 of FIG. 5B.

In other implementations, the techniques discussed herein, such as the system 300 of FIG. 3, etc. can allow for hierarchical FAQ generation as described in more detail in connection with FIG. 6A, FIGS. 6B, and 6C, etc.

Figure 6A:
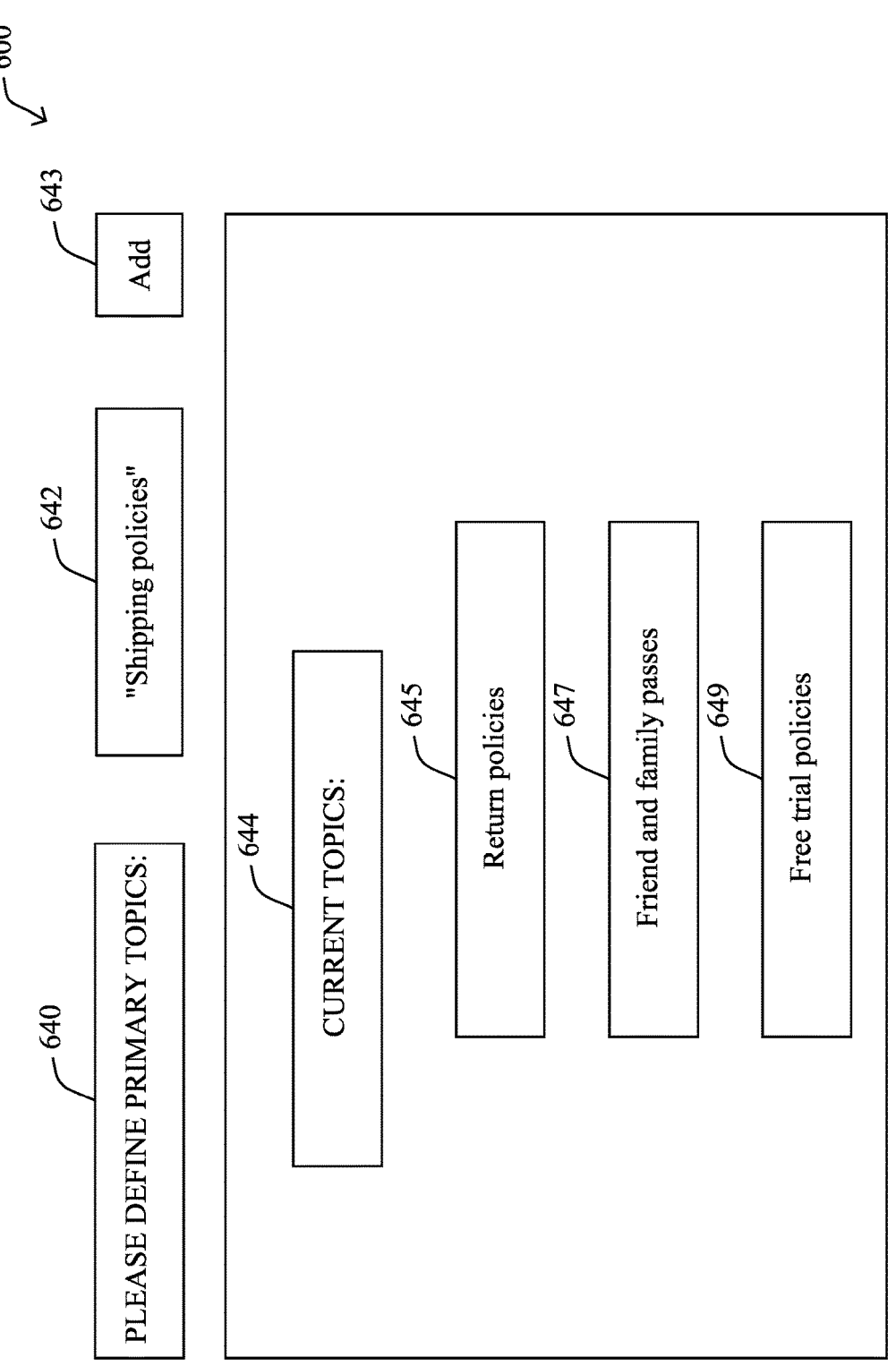
FIG. 6A illustrates an example user interface for administration defined hierarchical FAQ generation in accordance with the present disclosure.

FIG. 6A illustrates an example user interface for administration defined hierarchical frequently asked question generation in accordance with the present disclosure. In the example of FIG. 6A, a user interface 600 includes an option to define primary topics 640, which in the non-limiting example of FIG. 6A includes shipping policies 642. In addition, the user interface 600 includes an add 643 option which can allow a user to add additional primary topics, as shown in FIG. 6B.

In addition, as shown in FIG. 6A, the user interface 600 can include a list of current topics (e.g., current topics 644), which, in this non-limiting example include return policies 645, friend and family passes 647, and free trial policies 649. It will be appreciated that other current topics can be presented within the user interface 600.

Figure 6B:
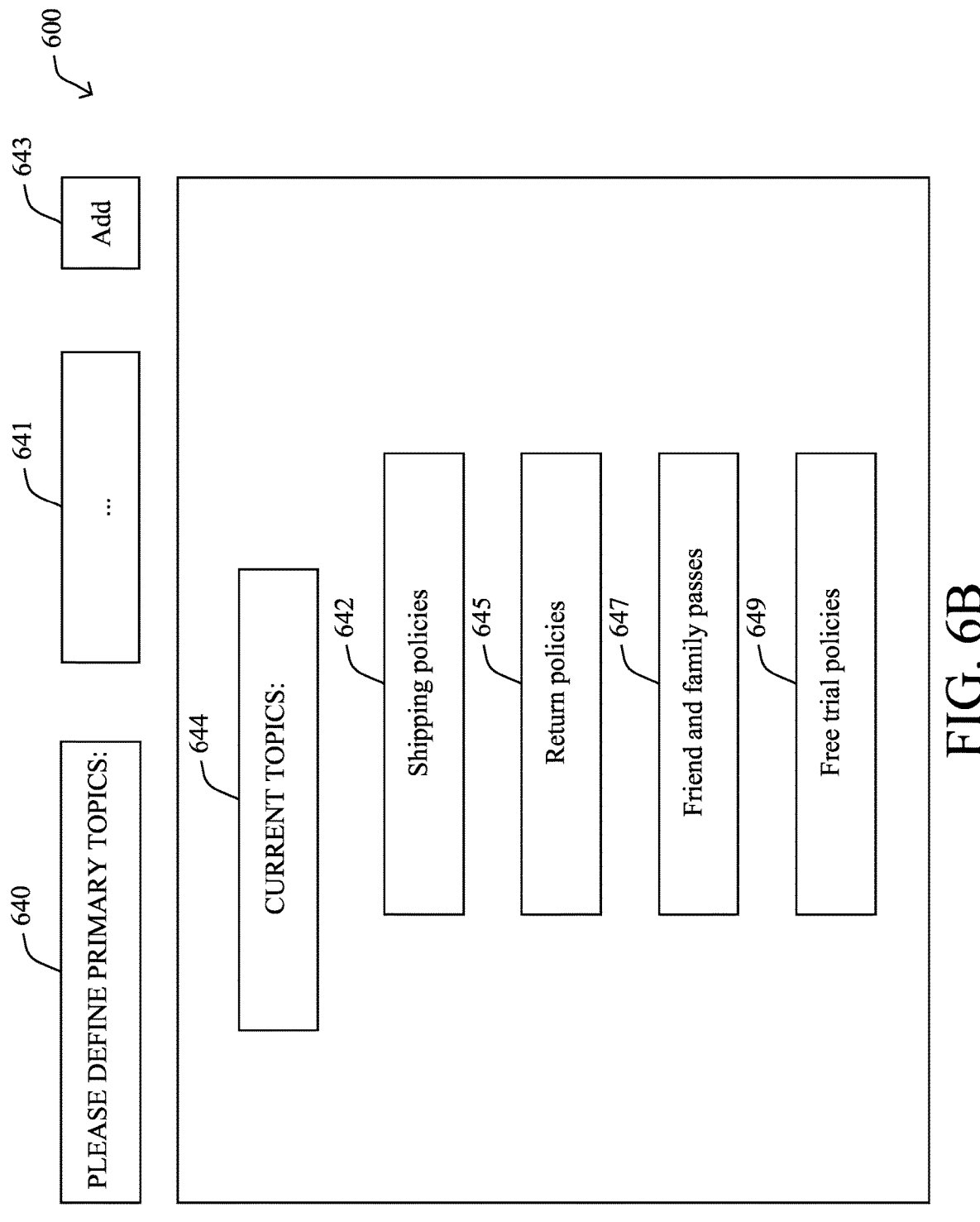
FIG. 6B illustrates an example user interface for administration defined hierarchical FAQ generation showing a response to actuation of the user interface in accordance with the present disclosure.

FIG. 6B illustrates an example user interface for administration defined hierarchical frequently asked question generation showing a response to actuation of the user interface in accordance with the present disclosure. The example of FIG. 6B shows a result of clicking the add 643 option when the shipping policies option is selected as shown in FIG. 6A.

That is, once the shipping policies 642 option has been selected, it is added to the current topics 644 list that is also shown in FIG. 6A. In addition, the field 641 that previously contained the shipping policies 642 primary topic is now empty, indicating that a new primary topic can be located for selection at the whim of the user.

Figure 6C:
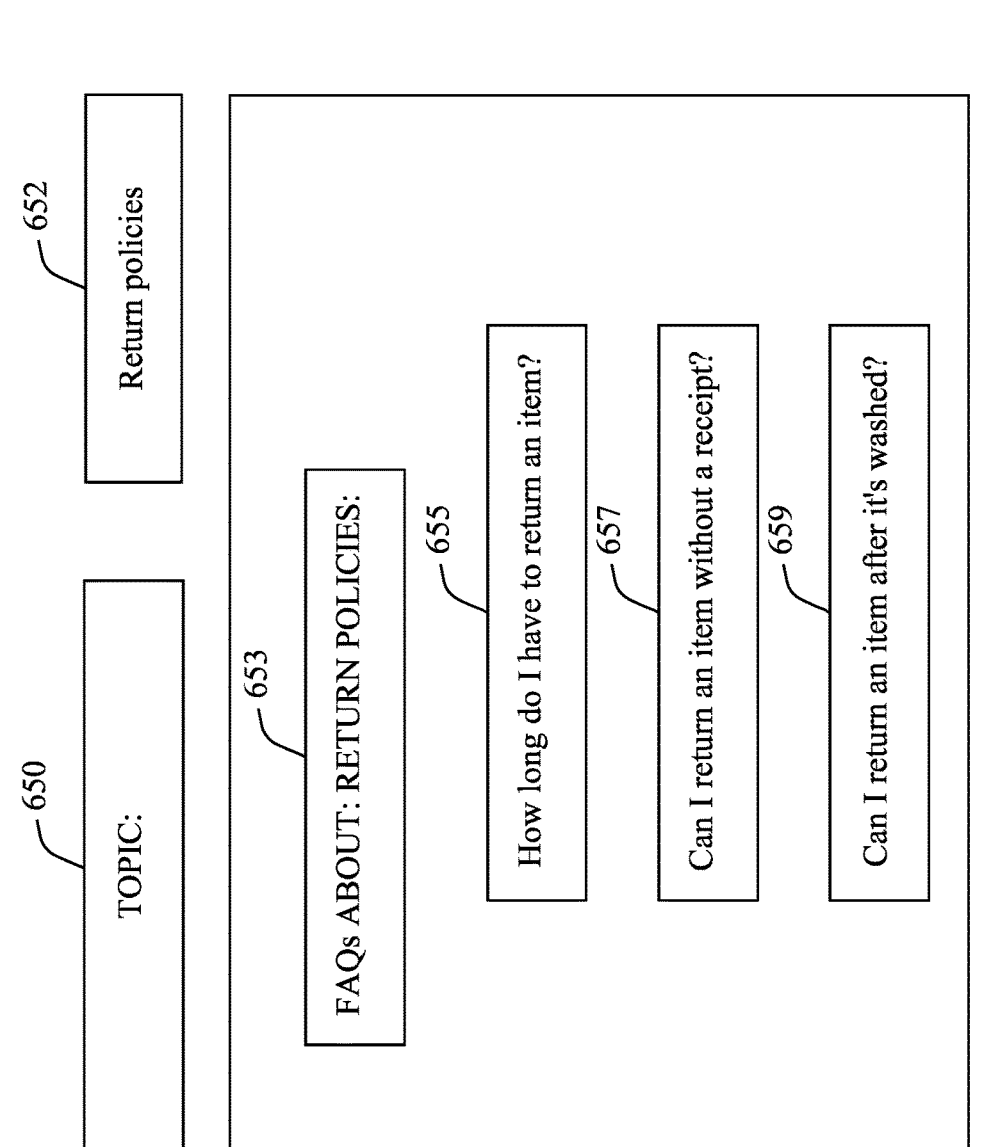
FIG. 6C illustrates an example user interface for administration defined hierarchical FAQ generation showing a further response to actuation of the user interface in accordance with the present disclosure.

FIG. 6C illustrates an example user interface for administration defined hierarchical frequently asked question generation showing a further response to actuation of the user interface in accordance with the present disclosure. In FIG. 6C, the user has selected the return policies 645 option shown in FIG. 6A and FIG. 6B, which causes the user interface 600 to open a new window or section.

As shown in FIG. 6C, this new section of the user interface 600 shows the topic 650 which, as mentioned above is return policies 652 in this non-limiting example. The user interface 600 then shows FAQs 653 about return policies, which can include questions such as "how long do I have to return an item" (shown at block 655), "can I return an item without a receipt (shown at block 657), and "can I return an item after it's washed" (shown at block 659).

FIG. 7 illustrates an example procedure 700 for a cache generated frequently asked questions page in accordance with the present disclosure. In some implementations, a non-generic, specifically configured device (e.g., device 200, an apparatus) may perform procedure 700 by executing stored instructions (e.g., process 248). The procedure 700 may start at step 705, and continues to step 710, where, as described in greater detail above, a device converts a received query into a set of embeddings. In some implementations, the procedure 700 can include converting the received query into the set of embeddings using a pre-trained sentence transformer, a Bidirectional Encoder Representations from Transformers model that has been fine-tuned for question-answer processing, or a Simple Contrastive Learning of Sentence Embeddings model to create semantically meaningful sentence embeddings, or any combination thereof, although implementations are not limited to these enumerated examples.

The procedure 700 may continue to step 715 where, as described in greater detail above, the device performs a semantic searching operation based on information contained in the set of embeddings against a cache of question and answer pairs. In some implementations, the procedure 700 may include performing the semantic searching operation using an artificial intelligence (AI) semantic search technique, such as a Facebook AI Similarity Search or other suitable AI semantic searching technique.

The procedure 700 may continue to step 720 where, as described in greater detail above, the device returns a stored answer to the received query responsive to a determination that a particular question and answer pair in the cache of question and answer pairs meets a threshold similarity level for the information contained in the set of embeddings, where the stored answer is derived from the particular question and answer pair. In some implementations, the procedure 700 can include determining that that the particular question and answer pair in the cache of question and answer pairs meets the threshold similarity level for the information contained in the set of embeddings based on the query embedding have a high degree of similarity to a stored embedding of a query in the cache pertaining to the particular question and answer pair.

The procedure 700 may continue to step 725 where, as described in greater detail above, the device performs a large language model operation to generate an answer to the query responsive to a determination that no question and answer pair in the cache of question and answer pairs meets the threshold similarity level for the information contained in the set of embeddings. In some implementations, the procedure 700 can include performing the large language model operation using one or more source documents contained within a system associated with the device. That is, in some implementations, the large language model operation can be performed using a given or supplied document that may be contained within a particular system and is therefore not available to the entire world or the entire internet.

The procedure 700 can further include caching, by the device, the answer to the query performed by the large language model operation in the cache of question and answer pairs. This can allow for the cache of question and answer pairs to be expanded over time as new question and answer pairs are uncovered and can reduce future necessity to invoke the large language model operation for question and answer pairs that have been generated by the large language model at least once.

In some implementations, the procedure 700 can further include receiving, by the device, user feedback corresponding to the stored answer to the received query or the answer to the query. In such implementations, the procedure 700 can also include logging, by the device, the particular question and answer pair associated with the answer to the query responsive to receiving the user feedback corresponding to the answer to the query based on the user feedback being positive or negative.

As discussed above, the procedure 700 can include receiving, by the device, a command from a user to perform the large language model operation to generate the answer to the query subsequent to returning the stored answer to the received query. This may occur in response to the user being dissatisfied with the stored answer to the received query and/or may be used to improve the results of the query.

In some implementations, the procedure 700 can include generating, by the device, a frequently asked questions page using most commonly encountered question and answer pairs in the cache of question and answer pairs that meet the threshold similarity level. In such implementations, the procedure 700 can further include providing, by the device, a list containing a particular quantity of most relevant asked questions for the frequently asked questions page.

As discussed above, the procedure 700 can include generating, by the device, a hierarchical frequently asked questions page by clustering question and answer pairs in the cache of question and answer pairs that meet the threshold similarity level into topics using unsupervised topic modeling. Implementations are not so limited, however, and in some implementations, the procedure 700 can include generating, by the device, a hierarchical frequently asked questions page by clustering question and answer pairs in the cache of question and answer pairs that meet the threshold similarity level based on system administrator input via a user interface.

The procedure 700 may end at step 730.

It should be noted that while certain steps within the procedures above may be optional as described above, the steps shown in the procedures above are merely examples for illustration, and certain other steps may be included or excluded as desired. Further, while a particular order of the steps is shown, this ordering is merely illustrative, and any suitable arrangement of the steps may be utilized without departing from the scope of the embodiments herein. Moreover, while procedures may have been described separately, certain steps from each procedure may be incorporated into each other procedure, and the procedures are not meant to be mutually exclusive.

In some implementations, an illustrative apparatus herein may comprise: one or more network interfaces to communicate with a network; a processor coupled to the one or more network interfaces and configured to execute one or more processes; and a memory configured to store a process that is executable by the processor, the process, when executed, configured to: convert a received query into a set of embeddings; perform a semantic searching operation based on information contained in the set of embeddings against a cache of question and answer pairs; return a stored answer to the received query responsive to a determination that a particular question and answer pair in the cache of question and answer pairs meets a threshold similarity level for the information contained in the set of embeddings, the stored answer derived from the particular question and answer pair; and perform a large language model operation to generate an answer to the query responsive to a determination that no question and answer pair in the cache of question and answer pairs meets the threshold similarity level for the information contained in the set of embeddings.

In still other implementations, a tangible, non-transitory, computer-readable medium storing program instructions that cause a device to execute a process comprising: converting, by a device, a received query into a set of embeddings; performing, by the device, a semantic searching operation based on information contained in the set of embeddings against a cache of question and answer pairs; returning, by the device, a stored answer to the received query responsive to a determination that a particular question and answer pair in the cache of question and answer pairs meets a threshold similarity level for the information contained in the set of embeddings, the stored answer derived from the particular question and answer pair; and performing, by the device, a large language model operation to generate an answer to the query responsive to a determination that no question and answer pair in the cache of question and answer pairs meets the threshold similarity level for the information contained in the set of embeddings.

The techniques described herein, therefore, provide for cache generated frequently asked questions page. As discussed above, these techniques improve question and answer mechanisms that rely on current paradigms by leveraging a caching mechanism for a LLM to generate a FAQ page that users can quickly reference, rather than repeatedly issuing queries to the LLM. Further, these techniques can avoid the costly process of sending the user's query on to the LLM while still utilizing the LLM to provide an answer to a query as needed.

Illustratively, the techniques described herein may be performed by hardware, software, and/or firmware, (e.g., an "apparatus") such as in accordance with the frequently asked question (FAQ) generation process (e.g., the process 248), and may include computer-executable instructions executed by the processor(s) 220 to perform functions relating to the techniques described herein, e.g., in conjunction with corresponding processes of other devices in the computer network as described herein (e.g., on agents, controllers, computing devices, servers, etc.). In addition, the components herein may be implemented on a singular device or in a distributed manner, in which case the combination of executing devices can be viewed as their own singular "device" for purposes of executing the process (e.g., process 248).

While there have been shown and described illustrative implementations above, it is to be understood that various other adaptations and modifications may be made within the intent and scope of the implementations herein. For example, while certain architectures, schemes, workloads, etc., are shown herein, the embodiments herein are not so limited.

Further, it is to be understood that various other adaptations and modifications may be made within the scope of the implementations herein. For example, while certain implementations are described herein with respect to certain types of computing architectures in particular, the techniques are not limited as such and may be used with any computing architecture, generally, in other implementations. In addition, while specific technologies, protocols, architectures, schemes, workloads, languages, etc., and associated devices have been shown, other suitable alternatives may be implemented in accordance with the techniques described above. In addition, while certain devices are shown, and with certain functionality being performed on certain devices, other suitable devices and process locations may be used, accordingly.

Moreover, while the present disclosure contains many other specifics, these should not be construed as limitations on the scope of any implementation or of what may be claimed, but rather as descriptions of features that may be specific to particular implementations. Certain features that are described in this document in the context of separate implementations can also be implemented in combination in a single implementation. Conversely, various features that are described in the context of a single implementation can also be implemented in multiple implementations separately or in any suitable sub-combination. Further, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the implementations described in the present disclosure should not be understood as requiring such separation in all implementations.

The foregoing description has been directed to specific implementations. It will be apparent, however, that other variations and modifications may be made to the described implementations, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the implementations herein. Therefore, it is the object of the appended claims to cover all such variations and modifications as come within the true intent and scope of the implementations herein.

What is claimed is:

1. A method, comprising:

converting, by a device, a received query into a set of embeddings;

performing, by the device, a semantic searching operation based on information contained in the set of embeddings against a cache of question and answer pairs;

determining, by the device, whether a particular question and answer pair in the cache of question and answer pairs meets a threshold similarity level for the information contained in the set of embeddings based on whether the received query has a high degree of similarity to a stored embedding of a query in the cache pertaining to the particular question and answer pair;

returning, by the device, a stored answer to the received query responsive to a determination that the particular question and answer pair in the cache of question and answer pairs meets the threshold similarity level for the information contained in the set of embeddings, the stored answer derived from the particular question and answer pair; and performing, by the device, a large language model operation to generate an answer to the received query responsive to a determination that no question and answer pair in the cache of question and answer pairs meets the threshold similarity level for the information contained in the set of embeddings.

2. The method of claim 1, further comprising:

receiving, by the device, user feedback corresponding to the stored answer to the received query or the answer to the received query.

3. The method of claim 2, further comprising:

logging, by the device, the particular question and answer pair associated with the answer to the received query responsive to receiving the user feedback corresponding to the answer to the received query based on the user feedback being positive or negative.

4. The method of claim 1, further comprising:

receiving, by the device, a command from a user to perform the large language model operation to generate the answer to the received query subsequent to returning the stored answer to the received query.

5. The method of claim 1, further comprising:

caching, by the device, the answer to the received query performed by the large language model operation in the cache of question and answer pairs.

6. The method of claim 1, further comprising:

generating, by the device, a frequently asked questions page using most commonly encountered question and answer pairs in the cache of question and answer pairs that meet the threshold similarity level.

7. The method of claim 6, further comprising:

providing, by the device, a list containing a particular quantity of most relevant asked questions for the frequently asked questions page.

8. The method of claim 1, further comprising:

generating, by the device, a hierarchical frequently asked questions page by clustering question and answer pairs in the cache of question and answer pairs that meet the threshold similarity level into topics using unsupervised topic modeling.

9. The method of claim 1, further comprising:

generating, by the device, a hierarchical frequently asked questions page by clustering question and answer pairs in the cache of question and answer pairs that meet the threshold similarity level based on system administrator input via a user interface.

10. The method of claim 1, further comprising:

converting the received query into the set of embeddings using a pre-trained sentence transformer, a Bidirectional Encoder Representations from Transformers model that has been fine-tuned for question-answer processing, or a Simple Contrastive Learning of Sentence Embeddings model to create semantically meaningful sentence embeddings, or any combination thereof.

11. The method as in claim 1, further comprising:

performing the semantic searching operation using an artificial intelligence semantic search technique.

12. The method as in claim 1, wherein performing the large language model operation includes invoking a large language model to compose the answer to the received query that is not present in the cache of the question and answer pairs.

13. The method as in claim 1, further comprising:

performing the large language model operation using one or more source documents contained within a system associated with the device.

14. An apparatus, comprising:

one or more network interfaces to communicate with a network;

a processor coupled to the one or more network interfaces and configured to execute one or more processes; and a memory configured to store a process that is executable by the processor, the process, when executed, configured to:

convert a received query into a set of embeddings;

perform a semantic searching operation based on information contained in the set of embeddings against a cache of question and answer pairs;

determine whether a particular question and answer pair in the cache of question and answer pairs meets a threshold similarity level for the information contained in the set of embeddings based on whether the received query has a high degree of similarity to a stored embedding of a query in the cache pertaining to the particular question and answer pair;

return a stored answer to the received query responsive to a determination that the particular question and answer pair in the cache of question and answer pairs meets the threshold similarity level for the information contained in the set of embeddings, the stored answer derived from the particular question and answer pair; and perform a large language model operation to generate an answer to the received query responsive to a determination that no question and answer pair in the cache of question and answer pairs meets the threshold similarity level for the information contained in the set of embeddings.

15. The apparatus as in claim 14, wherein the process, when executed, is configured to:

generate a frequently asked questions page using most commonly encountered question and answer pairs in the cache of question and answer pairs that meet the threshold similarity level.

16. The apparatus as in claim 14, wherein the process, when executed, is configured to:

generate a hierarchical frequently asked questions page by clustering question and answer pairs in the cache of question and answer pairs that meet the threshold similarity level into topics using unsupervised topic modeling.

17. The apparatus as in claim 14, wherein the process, when executed, is configured to:

generate a hierarchical frequently asked questions page by clustering question and answer pairs in the cache of question and answer pairs that meet the threshold similarity level based on system administrator input via a user interface.

18. The apparatus as in claim 14, wherein the process, when executed, is configured to:

perform the large language model operation by invoking a large language model to compose the answer to the received query that is not present in the cache of the question and answer pairs.

19. The apparatus as in claim 14, wherein the process, when executed, is configured to:

performing the large language model operation using one or more source documents contained within a system associated with the apparatus.

20. A tangible, non-transitory, computer-readable medium storing program instructions that cause a device to execute a process comprising:

converting a received query into a set of embeddings;

performing a semantic searching operation based on information contained in the set of embeddings against a cache of question and answer pairs;

determining whether a particular question and answer pair in the cache of question and answer pairs meets a threshold similarity level for the information contained in the set of embeddings based on whether the received query has a high degree of similarity to a stored embedding of a query in the cache pertaining to the particular question and answer pair;

returning a stored answer to the received query responsive to a determination that the particular question and answer pair in the cache of question and answer pairs meets the threshold similarity level for the information contained in the set of embeddings, the stored answer derived from the particular question and answer pair; and performing a large language model operation to generate an answer to the received query responsive to a determination that no question and answer pair in the cache of question and answer pairs meets the threshold similarity level for the information contained in the set of embeddings.

\* \* \* \* \*